No. 836,647. PATENTED NOV. 20, 1906.
T. E. MARTIN.
FURNACE GRATE.
APPLICATION FILED MAY 6, 1905.
5 SHEETS—SHEET 1.
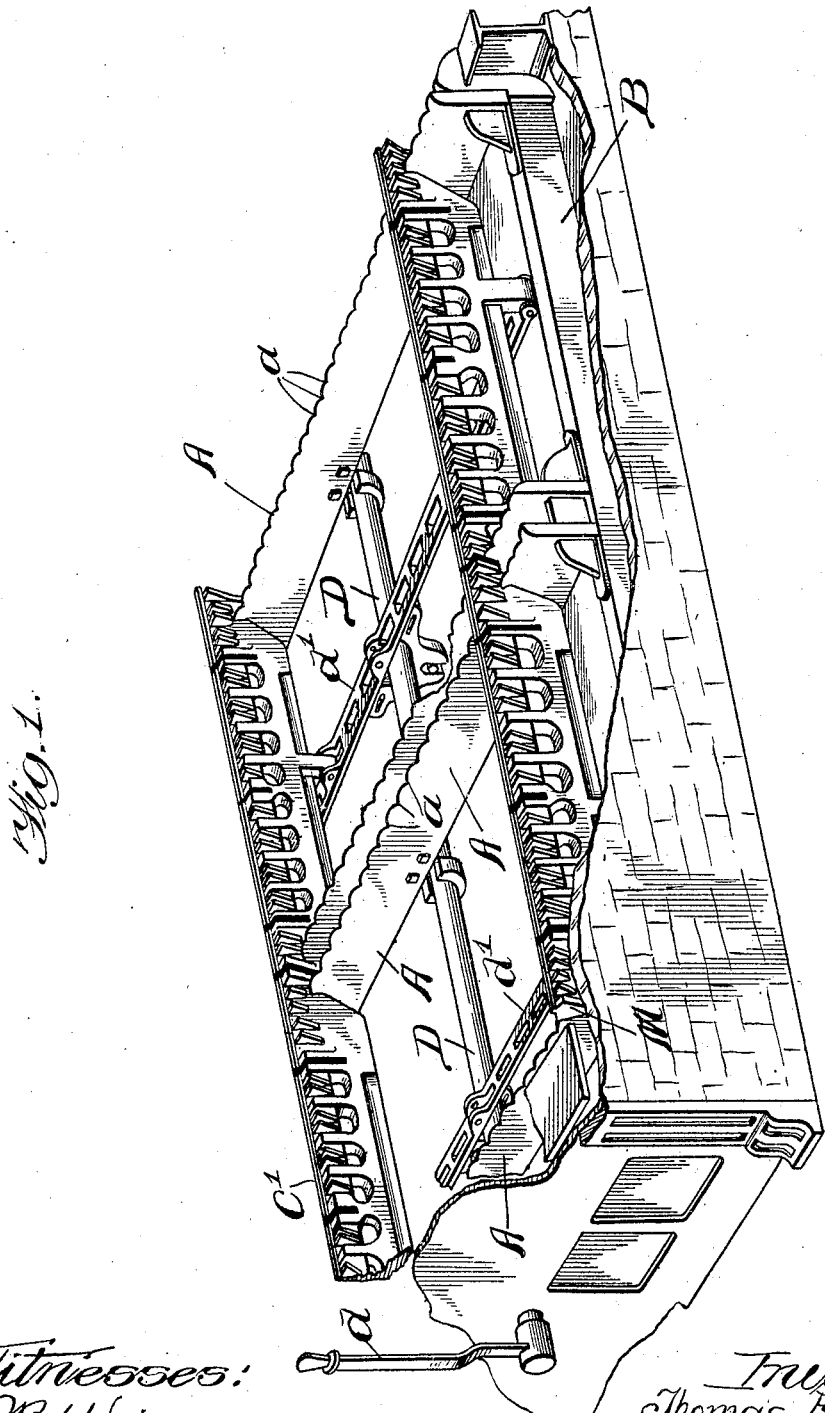

No. 836,647. PATENTED NOV. 20, 1906.
T. E. MARTIN.
FURNACE GRATE.
APPLICATION FILED MAY 6, 1905.
5 SHEETS—SHEET 2.
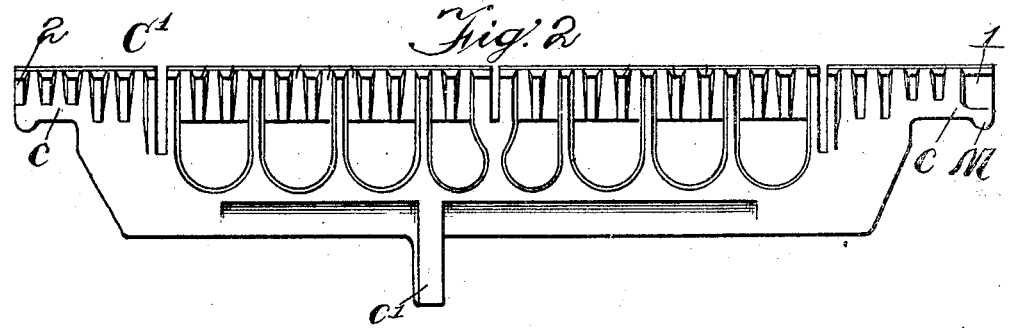
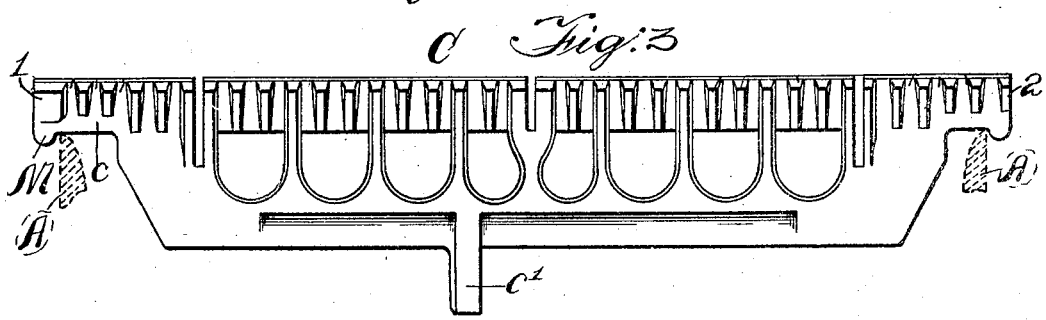
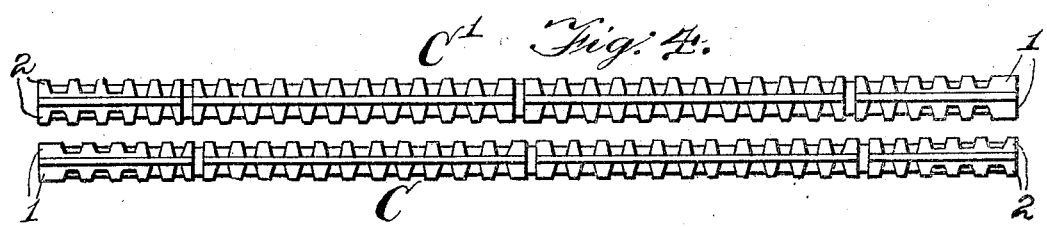
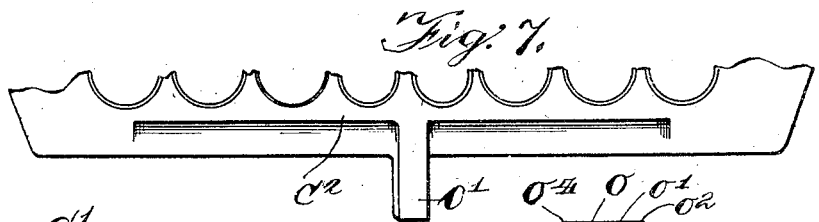
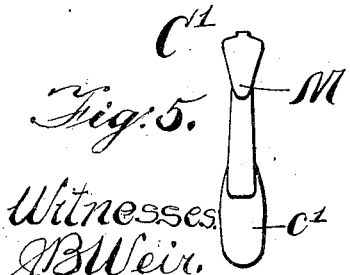
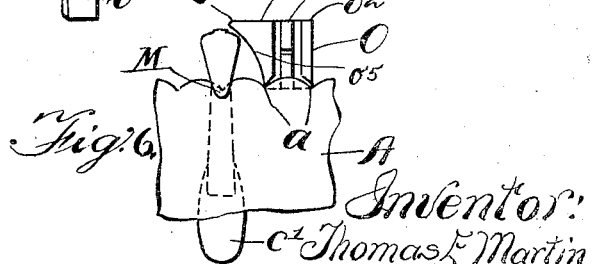

No. 836,647. PATENTED NOV. 20, 1906.
T. E. MARTIN.
FURNACE GRATE.
APPLICATION FILED MAY 6, 1905.
5 SHEETS—SHEET 3.
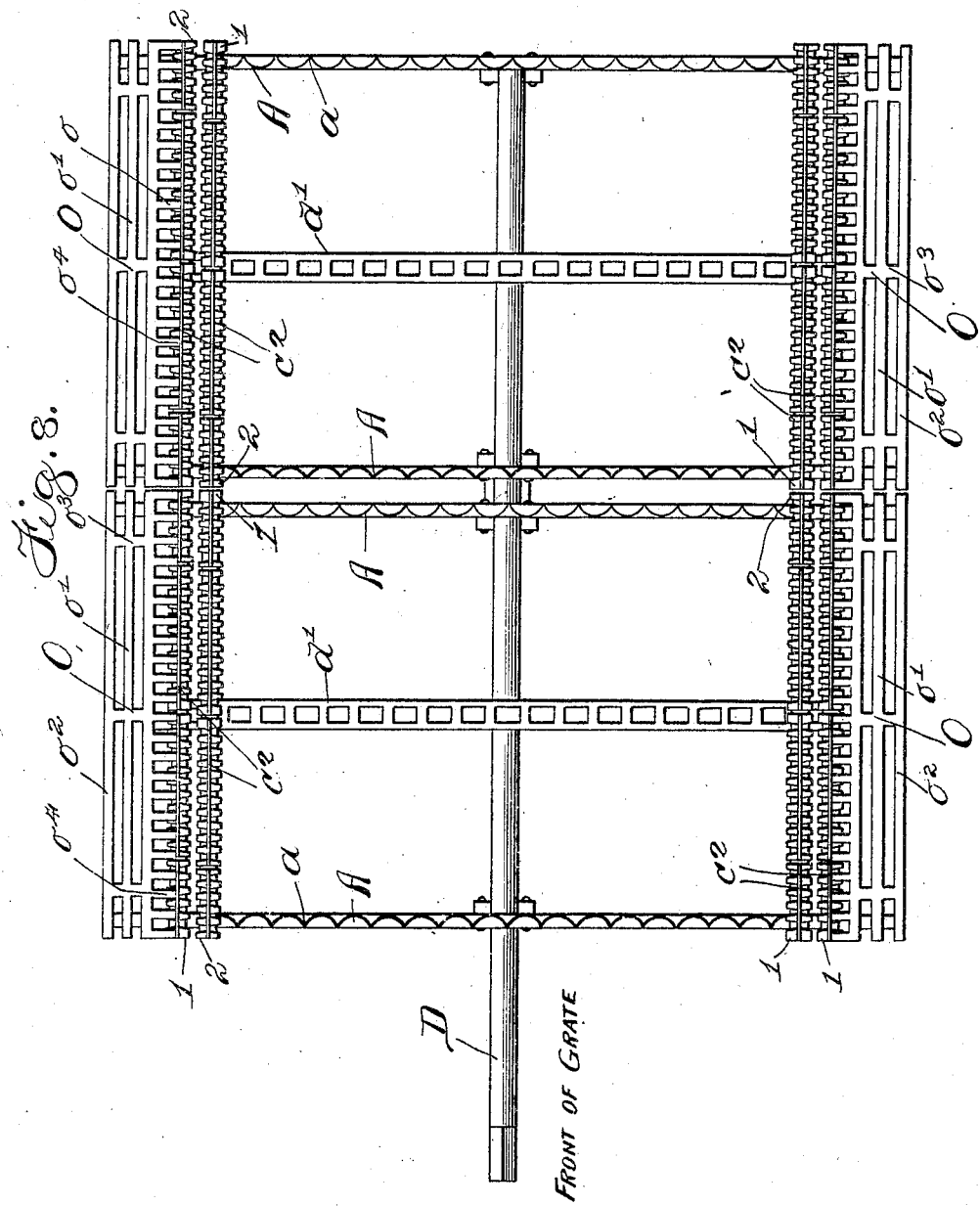

No. 836,647. PATENTED NOV. 20, 1906.
T. E. MARTIN.
FURNACE GRATE.
APPLICATION FILED MAY 6, 1905.
5 SHEETS—SHEET 4.
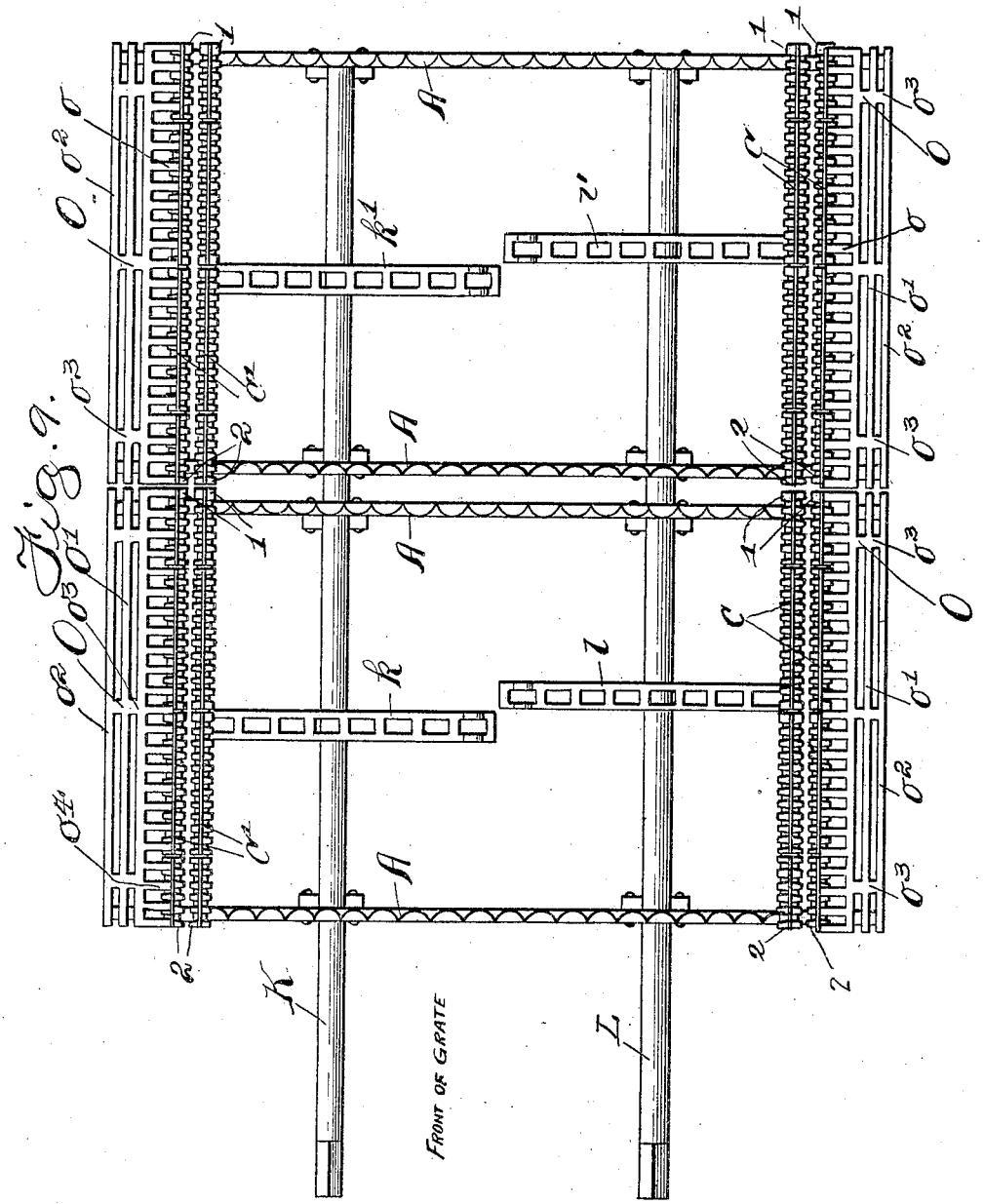

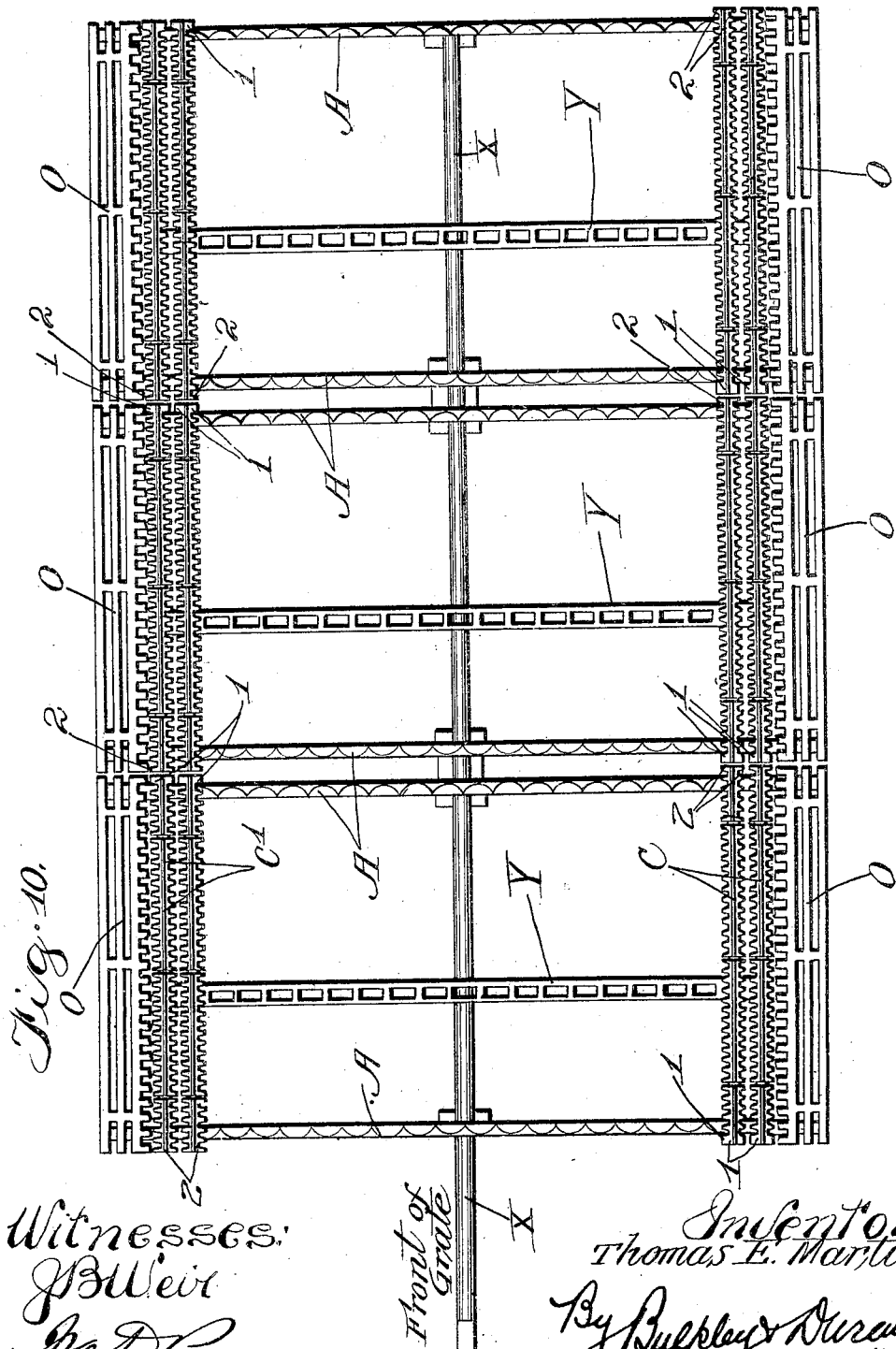

UNITED STATES PATENT OFFICE.

THOMAS E. MARTIN, OF BUFFALO, NEW YORK.

FURNACE-GRATE.

No. 836,647. Specification of Letters Patent. Patented Nov. 20, 1906.

Original application filed December 26, 1901, Serial No. 87,240. Divided and this application filed May 6, 1905. Serial No. 259,157.

*To all whom it may concern:*

Be it known that I, THOMAS E. MARTIN, a citizen of the United States of America, and a resident of Buffalo, New York, have invented a certain new and useful Improvement in Furnace-Grates, of which the following is a specification.

This application is a division of my former application, Serial No. 87,240, filed December 26, 1901. In said former application I have claimed certain novel features and details of construction which relate more to the grate-bar itself, while in the present application I have claimed certain novel features and details of construction which relate more to the general construction of a furnace-grate.

My invention relates to furnace-grates in general, but more particularly to grates in which the grate-bars are readily removable from the grate structure, and especially to grates in which the bars are mounted and connected for rocking motion. Certain features of my invention are, however, applicable to all kinds of grates, and I do not, therefore, limit myself to any particular construction.

Generally stated, the object of my invention is to provide a simple, inexpensive, and thoroughly efficient construction of grate which may be readily employed in connection with different kinds of furnaces.

Certain special objects are to provide a form of grate-bar which will permit the bars in a grate to be arranged either in such manner that the teeth of one bar will be opposite the openings of the adjacent bars—that is to say, in such manner that the teeth of one bar will be staggered with respect to the teeth of the adjacent bars—or, if desired, in such manner that the teeth of one bar will be in line with or opposite the teeth of the adjacent bars, and to provide certain details and features of improvement tending to increase the general efficiency of a furnace and to render a grate-bar of this character more serviceable and satisfactory in use.

The nature of my improved grate-bar and furnace with the construction for obtaining the foregoing and other advantages will, however, hereinafter more fully appear.

In the accompanying drawings, Figure 1 is a perspective of a furnace-grate embodying the principles of my invention, it being unstood that only a few of the grate-bars are shown in place upon the bearing-bars. Fig. 2 is a side elevation of a grate-bar involving the principles of my invention. Fig. 3 is a view similar to Fig. 2, but showing another form of bar. Fig. 4 is a plan of the two bars shown in Figs. 2 and 3, illustrating the staggered arrangement of the teeth of one bar relatively to those of the other. Fig. 5 is an end view of the bar shown in Fig. 2. Fig. 6 is a detail showing the relation between one of the stationary grate-bars and the adjacent tilting or rocking bar, both bars being mounted on the bearing or supporting bar. Fig. 7 shows a portion of a grate-bar similar to the one shown in Fig. 2, with the exception that the stem or leg is located at the center of the bar. Fig. 8 is a plan of the grate structure shown in Fig. 1, the bars at the top of the view illustrating the arrangement adopted when it is desired to stagger the teeth of one bar with respect to the teeth of the adjacent bars, the bars at the bottom of the view showing the other arrangement, in which the teeth are all in line. Fig. 9 is a plan of a furnace-grate, illustrating the purpose of locating a grate-bar stem or leg off center and showing a grate in which the grate-bars are arranged in two independently-operated and longitudinally-extending sections, each section, as in the previous views, consisting of two sets of grate-bars. Fig. 10 shows a furnace-grate composed of two kinds of bars and having but one longitudinally-extending shaft or shaker-rod.

The furnace can of course be of any suitable form and character, and the structure for supporting the grate-bars can also be of any suitable form or construction. For example, as shown in Figs. 1 and 8, the grate structure may comprise a suitable number of bearing-bars A, arranged transversely and having their ends supported on beams or sills B. With this construction the grate-bars are preferably arranged longitudinally within the furnace and are preferably arranged in series or sets. As shown in Fig. 8, the grate is composed of two sections, each section comprising a couple of parallel and transversely-arranged bearing-bars A and a suitable number of longitudinally-extending grate-bars C² of the character indicated in Fig. 7. With respect to the preferred formation of the end portions of the grate-bars the upper edges of the bearing-bars A are preferably provided with notches or seats $a$, which maintain the proper relative positions of the grate-bars. As shown in Figs. 1 and 8, the grate is of the movable or rocking type— that is to say, the grate-bars are mounted to rock or turn about longitudinal axes. With such arrangement any suitable means can be employed for rocking the bars—as, for example, the longitudinally-extending shaft D, which may be mounted in bearings on the under sides of the bearing-bars A. The forward end of this shaft can be provided with a hand-lever $d$, and the connection between this shaft and the grate-bars may consist of transversely-arranged bars $d'$, having openings and ears adapted to engage the depending stems on the grate-bars, as shown in my former patent, No. 619,494, dated February 14, 1899. When it is desired to shake the grate, the shaft D is oscillated or partially rotated by the lever $d$, which imparts a rocking movement to the grate-bars through the medium of the connecting-bars $d'$. It will be readily understood that the connection between the shaft D and these connecting-bars $d'$, whereby the latter are given a vibratory longitudinal or end movement, may be of any suitable form and character; but I preferably use the connection shown in my above-mentioned former patent. The structure thus provided for supporting the grate-bars and also the shaking apparatus is simple and serviceable in character. As stated, however, both the shaking apparatus and the supporting structure for the grate-bars can be of any suitable known or approved form. With the provision of the bearing-bars A, having the seats or notches $a$, the grate-bars may be made readily removable from the grate. For example, each end of the grate-bar may be provided with a bearing portion $c$, the lower edge of which can be adapted to rest or fit within the seats formed in the upper edges of the said bearing-bars. If desired, the lower edges of these bearing portions $c$ can be of a knife-edge character, so as to reduce friction and permit the bars to rock or oscillate freely upon their bearings. Furthermore, the bars thus made removable can be given a formation whereby either a staggered or an alined arrangement of the teeth of one bar with respect to the teeth of adjacent bars can be readily obtained. For example, with a grate composed of two sections, as shown in Fig. 9, the bars C in one set can be of the character shown in Fig. 3, while the bars C' in the other set can be of the character shown in Fig. 2. These two bars are substantially alike, with the exception that in Fig. 3 the spaces between the teeth are as a whole shifted slightly to the right, so as to provide the forward end of the bar with a thick tooth 1, while in Fig. 2 the spaces between the teeth are as a whole located farther to the left, so as to provide the opposite or rear end of the bar with a similar thick tooth 1. In this way the bars are substantially alike, except that the thick tooth 1 in bar C is on the forward end, while such tooth in the case of bar C' is on the rear end. At this juncture it will be understood that the terms "forward" and "rear" are employed merely for convenience of description. In fact, the bars in the grate can all be alike, if desired; but, as illustrated, the stem or leg $c'$ of the bar is preferably nearer its forward end than its rear end—that is, is nearer the thick-end teeth in bar C and nearer the thin-end teeth in bar C'. Consequently, as will hereinafter more fully appear, it is preferable to have two forms of the grate-bar.

With half of the bars of the character shown in Fig. 3 and with the other half of the character shown in Fig. 2 each section of the grate can be composed of two sets, as shown in Fig. 9, the bars C being mounted in the right-hand set and the bars C' in the left-hand set. It will be seen that the furnace is made with front and rear sections, the bars of one set being at the right of the two sections and the bars of the other set being at the left of said sections. With such arrangement the teeth of each set and of the whole grate will all be in line, inasmuch as each grate set is composed of bars all of a similar form or pattern. Should it be desired, however, to alter the grate so as to reduce the size of the openings or interstices between the grate-bars, it is then only necessary to, for example, remove every other bar from the right-hand set of the grate and replace the same with a like number of bars from the left-hand set. Such arrangement is shown at the top of Fig. 8, where it will be seen that the first bar has a large tooth at its forward end, while the second bar has a large tooth at its rear end. With this arrangement the ends of the bars are, as in the previous case, even; but the teeth of one bar are now in line with the openings of the adjacent bars, thus producing a staggered arrangement of the teeth of one bar with respect to the teeth of the adjacent bars. This, as will be seen, has the effect of reducing the size of the openings between the grate-bars. When the large teeth in a set are all at the same end, as shown at the bottom of Fig. 8, the teeth of the bars are all in line. When the bars are interchanged, reversed, or transposed, however, so that the alternate bars of one set have large teeth at their forward ends, while the intermediate bars of the same set have the large teeth at their rear ends, then the teeth have the out-of-line or staggered arrangement shown at the top of Fig. 8. At this juncture it will be seen that in Fig. 8 the staggered arrangement is obtained by simply turning every other bar end for end, the leg of each bar being at the center; but in Fig. 9 it is necessary to both reverse and interchange the bars. In this way I provide a furnace-grate having removable grate-bars of such formation and character that the grate can be quickly changed or altered so as to either stagger or aline the teeth, as may be desired.

As previously stated and explained, the stem or leg of my improved grate-bar is preferably arranged off center or nearer one end than the other, and this formation permits the grate-bars to be readily arranged in two independent sets, each adapted to be shaken or operated independently of the other. For example, in Fig. 9 a furnace-grate is shown in which the bars are arranged in two longitudinally-extending sets, one set being operated by the rocking shaft K and the other set by a similar shaft L. In the set operated by the shaft K the bars are all turned so that their stems or legs are nearer the front of the grate than the rear. In the other set, however, the bars are arranged so that their stems or legs are nearer the rear of the grate than the front. The set of grate-bars operated by the shaft K is operated by the connecting or shaker bars $k\ k'$, while the set of grate-bars in the other section is operated by similar connecting or shaker bars $l\ l'$. As the bars in the two sets are turned in opposite directions the shaker-bars $k\ k'$ are therefore out of line with the connecting or shaker bars $l\ l'$. The connecting or shaker bars in this way do not interfere with each other when either set of the grate is operated or when both sets are operated together. It will be seen, therefore, that the location of the grate-bar stem or leg at a point nearer one end of the bar than the other permits of the arrangement of the bars in a plurality of independently-operated sets and permits the connecting or shaker bars of the different sets to be arranged out of line, so as not to interfere with each other.

Thus it will be seen that I not only produce a grate-bar in which the construction is such as to insure good results, but that I also provide a formation which permits a furnace-grate to be readily changed, so as either to aline or stagger the grate-teeth, and, furthermore, that I provide a formation of grate-bar which permits the bars to be arranged either in two or more independently-operated sets or in such manner as to be shaken or operated simultaneously by a single shaking apparatus.

The bearing-bars A can, as a matter of still further and special improvement, have sharpened or reduced upper edges, as shown in Fig. 3. With this formation these bearing-bars present a relatively small bearing-surface to the grate-bars, thereby reducing friction. As a further advantage the upper edges of these bearing-bars when thus thinned down or sharpened do not afford a lodging-place for fuel or ashes or any other substance which might tend to interfere with the operation of the grate. It will also be seen at this juncture that the ends or bearing portions of the grate-bars are preferably provided with downwardly-depending lugs M, which project downwardly outside of the bearing-bars. In this way the grate-bars are all provided with lugs which hold the bars in place and which serve as a means for keeping the ends of the bars even or in line. As a further advantage of this construction it will be seen that each bar can expand longitudinally, its ends or bearing portions simply sliding across the upper edges of the bearing-bars, so as to bring the lugs M farther away from the outside surfaces of the bearing-bars. In this way a longitudinal expansion of the bar tends practically to move it in its bearings or on its support rather than to tighten it thereon in such manner as to make removal difficult. In other words, with my improved construction each bar is free to expand longitudinally and in so doing does not tighten, jam, or bind relatively to the supporting structure.

A further feature of improvement consists in the outside or stationary bars O. In cross-section these bars O are substantially as shown in Fig. 6. In this view it will be seen that each bar O is composed of three bars or webs $o\ o'\ o^2$, connected by transverse webs $o^3$. The inside bar or longitudinally-extending web $o$ is provided, preferably, with teeth $o^4$, which are preferably arranged to overhang the adjacent grate-bar. At this juncture it will be seen that these outside or stationary bars O are preferably of greater height than the rocking bars. The overhanging portion of each bar O is preferably of such character as to permit the adjacent rocking bar to rock or oscillate freely and to do so without creating a gap between the two bars. In other words, the relative formation is such that the grate can be shaken without creating undesirable gaps between the outside stationary bars and the adjacent rocking bars. Furthermore, the end portions of each stationary bar O are preferably so formed that only the webs or bars $o$ and $o^2$ rest upon the bearing-bars A. This result is preferably obtained by cutting away the ends of the bar $o'$, so that such end portions do not touch or make contact with the said bearing-bars A. In this way the end portions of the bars or webs $o\ o^2$ rest firmly in the seats or notches $a$ and with only two bearing-points at each end. The bars O do not, therefore, have any tendency to rock or tilt.

With further reference to the feature of adjusting the bars so as to either aline or stagger the teeth, as the character of the fuel may require, it will be seen that the same result can be obtained by still another arrangement of the sets of grate-bars. For example, with the construction shown in Fig. 8 the transverse front section of grate-bars can be composed of a number of subsets—for example, two, one subset having thick teeth at their rear ends and the other subset having thick teeth at their forward ends. The rear section can also be composed of similar subsets having thick teeth at one end and thin teeth at the other end. With this arrangement the staggered effect or arrangement of the grate-teeth can be obtained by simply interchanging or transposing the alternate bars of the subsets in the same set and not, as in the case of Fig. 9, by interchanging and reversing the alternate bars of the two sets. Thus it will be seen that I provide grate-bars which can be arranged within the furnace in many different ways, according to the size and character of the boiler, but that in each arrangement the bars can be readily interchanged or adjusted so as to either aline or stagger the teeth, as may be desired. In this way the openings in the grate are adjustable or variable and can be changed to suit the character of the fuel.

In Fig. 10 I have illustrated a furnace composed of three transversely-arranged sections, each section comprising two sets of bars and there being only one shaft or shaker-rod X extending longitudinally of the entire furnace. Viewing the furnace from the front, all of the bars at the left of the shaft X have the small teeth 2 at their forward ends, while all of the bars at the right of said shaft have large teeth 1 at their forward ends. Consequently all of the bars at the left of said shaft are of the kind shown in Fig. 2, while all of the bars at the right are the kind shown in Fig. 3—that is, when the teeth of adjacent bars are opposite each other. In this furnace the legs of the bars are connected with the shaft by means of shaker-bars or connecting-rods Y, whereby all of the bars in the furnace can be shaken or rocked by slightly rotating the shaft X. In this construction the change from coarse openings to fine openings, and vice versa, is made by transposing or interchanging the bars—that is to say, by substituting one-half of the bars at one side of the shaft for one-half the bars at the other side thereof. For example, the alternate bars can be removed from the left-hand side of the shaft and substituted for all of the alternate bars at the right-hand side thereof, thus changing the size of the openings in the grate. As shown in Fig. 10, the bars C are all at one side of the shaft, while the bars C' are all at the other side thereof, so that the furnace when viewed from the front presents only thick teeth 1 at the right-hand side of the shaft and only thin teeth 2 at the left-hand side thereof. In any event, however, and whether the furnace-grate comprises two kinds of bars or only one kind of bar, and regardless of whether the bars be of the kind shown in Fig. 2 or Fig. 3 or Fig. 7, it is true that the teeth of the alternate bars may be brought opposite the spaces of the teeth of the intermediate bars by arranging the former with their like ends in one direction and the latter with their like ends in the opposite direction. In other words, and regardless of the particular construction and kind of bar employed, this change is effected by arranging the alternate bars with their small-tooth ends in one direction and the intermediate bars with their large-tooth ends in the opposite direction.

Viewing the side of the bar or looking down on top of the bar, it will be seen that the spaces between the teeth are as a whole nearer one end of the bar than the other. It is also proper to say that each bar has a thick tooth at one end, a thin tooth at the other end, and a number of evenly-spaced intermediate teeth, said intermediate teeth being as a whole nearer one end of the bar than the other—that is, nearer the thin-tooth end of the bar than its thick-tooth end. It will be understood, of course, that by the end of the bar is meant its extreme or outer end surface.

It will be observed that by arranging the spaces collectively nearer one end of the bar than the other the teeth will thereby be so arranged that when each bar is reversed or the bars are transposed those on one side of the bar will occupy the positions which were occupied by the spaces on the opposite side before reversal or transposition. It will be understood, therefore, that in the following claims I do not limit myself to grate-bars which are necessarily reversible in order to stagger or aline the teeth. The specific claims for reversible bars are in my divisional application Serial No. 316,612, filed May 14, 1906. In other words, I provide a plurality of grate-bars having laterally-projecting teeth, said teeth (at least all those between the end teeth) being so disposed that they are as a whole, the thickness of one tooth nearer one end of the bar than the other. Also these teeth, in effect, provide spaces between them, said spaces being arranged in two parallel rows or series, each series of spaces being as a whole a distance equal to the thickness of one tooth nearer one end of the bar than the other. With such an arrangement, as previously stated, various methods may be employed for changing the teeth from a staggered to an alined condition, and vice versa. In each case, however, as stated, all of the teeth between the end teeth 1 and 2 are, taken as a whole, just the thickness of one tooth nearer one end of the bar than the other—that is, nearer one bearing portion than the other.

What I claim as my invention is—

1. A grate, and means for supporting the same, consisting of a plurality of grate-sections arranged end to end, a plurality of parallel grate-bars in each section, said grate-bars being arranged longitudinally of the furnace, and each having a depending leg, shaker-bars engaging the ends of said legs, the said shaker-bars being arranged transversely of the furnace, and in a plurality of sets with the inner ends of one set out of line relative to the adjacent inner ends of another set, whereby the transverse shaker-bars of the different longitudinally-extending sections when operated reciprocate past each other, and a plurality of parallel shaker-shafts extending longitudinally of the furnace and suitably connected with said transverse shaker-bars.

2. A grate comprising in combination, bearing-bars, a plurality of rockingly-supported removable grate-bars each provided with evenly-spaced teeth extending laterally from the sides thereof, thus forming two parallel series of spaces between the teeth, both series of spaces being as a whole the thickness of one tooth nearer one end of the bar than the other, whereby said grate-bars are adapted for suitable rearrangement to either stagger or aline the teeth thereof.

3. In a grate, the combination of bearing members, and two kinds of grate-bars mounted on said members, the bars of one kind being interchangeable with those of the other kind, said grate-bars having evenly-spaced teeth projecting laterally therefrom, the teeth of one kind of grate-bar occupying when interchanged the positions occupied by the spaces between the teeth of the other kind of bar, thereby adapting said grate-bars to be interchanged to either stagger or aline the teeth thereof.

4. In a grate, the combination of bearing members, rocking grate-bars mounted interchangeably in the bearings of said members, part of said grate-bars having legs nearer one end of each bar, the other bars having legs nearer the other end of each bar, each grate-bar being provided with two rows of laterally-projecting evenly-spaced teeth the spaces between which are as a whole nearer the one end of the bar than the other, thereby adapting said grate-bars to be interchanged to either stagger or aline the teeth thereof, and means engaging said legs to rock the grate-bars, said grate-bars suitably spaced apart to permit each bar to rock its teeth opposite either the teeth or the spaces of adjacent bars.

5. In a grate, the combination of bearing members, grate-bars mounted on said members, adapted to rock thereon, and means for rocking said bars, each grate-bar provided with evenly-spaced teeth projecting laterally therefrom, the teeth of a plurality of said bars being so disposed that in each bar the evenly-spaced teeth have the spaces between them arranged in two parallel series, each series of spaces being as a whole the thickness of one tooth nearer one end of the bar than the other, whereby said grate-bars are adapted for suitable rearrangement to either stagger or aline the teeth thereof, and said grate-bars being suitably spaced apart to permit each bar to rock its teeth opposite either the teeth or spaces of adjacent bars.

6. In a grate, the combination of bearing members, removable rocking grate-bars mounted in the bearings of said members, each bar provided with knife-edge bearing portions, and means for rocking said grate-bars, each bar having evenly-spaced teeth projecting laterally therefrom, the said teeth on a plurality of said grate-bars being so disposed that in each bar the evenly-spaced teeth have the spaces between them arranged in two parallel series, each series of spaces being as a whole the thickness of one tooth nearer one end of the bar than the other, said grate-bars being thereby adapted for suitable rearrangement to either stagger or aline the teeth thereof, and said knife-edge bearings being suitably spaced apart to permit each grate-bar to rock its teeth opposite either the teeth or the spaces of adjacent bars.

7. In a grate, the combination of bearing members, removable rocking grate-bars mounted on said bearing members, and means for rocking said grate-bars, each grate-bar provided with laterally-projecting thick teeth at one end and thin teeth at the other end, with evenly-spaced teeth intermediate said thick and thin teeth, thereby adapting the grate-bars to be suitably rearranged to either stagger or aline the teeth thereof, said grate-bars suitably spaced apart to permit each bar to rock its intermediate teeth opposite either the teeth or the spaces of adjacent bars.

8. In a grate, the combination of bearing members, removable rocking grate-bars mounted on the said bearing members, and means for rocking said grate-bars, each grate-bar having evenly-spaced laterally-projecting teeth so disposed thereon that in each bar the evenly-spaced teeth have the spaces between them arranged in two parallel series, each series of spaces being a distance equal to the thickness of one tooth nearer one end of the bar than the other, thereby permitting suitable rearrangement of the grate-bars to either stagger or aline the teeth thereof, said grate-bars suitably spaced apart to permit each bar to rock its teeth opposite either the teeth or the spaces of adjacent bars.

9. In a grate, removable rocking grate-bars, a plurality of which are provided with evenly-spaced laterally-projecting teeth so disposed that in each bar the evenly-spaced teeth have the spaces between them arranged in two parallel series, each series of spaces being as a whole the thickness of one tooth nearer one end of the bar than the other, thereby adapting the grate for suitable rearrangement to either stagger or aline the teeth of adjacent bars, means for rocking the grate-bars, and means for spacing the bars apart to permit each bar to rock its teeth opposite either the teeth or spaces of adjacent bars.

10. A grate comprising in combination bearing-bars, a plurality of grate-bars supported in the bearings of said bearing-bars, each grate-bar having an upper web provided with evenly-spaced teeth extending laterally from the sides thereof, said teeth being so disposed that in each bar the evenly-spaced teeth have the spaces between them arranged in two parallel series, each series of spaces as a whole being the thickness of one tooth nearer one end of the bar than the other, the web of each grate-bar constituting the crest thereof, said grate-bars being adapted for ready removal and replacement, whereby the relation of said grate-bars to each other can be suitably changed or varied to bring the teeth of each bar opposite the teeth of adjacent bars, or to bring the teeth of the alternate bars opposite the spaces of the intermediate bars.

11. In a grate, grate-bars of two kinds, each bar provided with laterally-projecting evenly-spaced teeth, the teeth of a plurality of said grate-bars being so arranged that in each bar the evenly-spaced teeth have the spaces between them arranged in two parallel series, each series of spaces being as a whole the thickness of one tooth nearer one end of the bar than the other, thereby adapting the bars of one kind to alternate with those of the other kind to stagger the teeth of each bar relatively to the teeth of adjacent bars and also adapting the grate for suitable rearrangement to bring bars of a kind together to aline the teeth thereof.

Signed by me at Buffalo, New York, this 3d day of May, 1905.

THOMAS E. MARTIN.

Witnesses:
EMMA A. PELLMAN,
CHARLES H. SCHANNE.